March 8, 1966          F. DURAND          3,238,803
TRANSMISSION MECHANISMS INCORPORATING PLAY TAKE-UP MEANS
Filed March 30, 1964          2 Sheets-Sheet 1
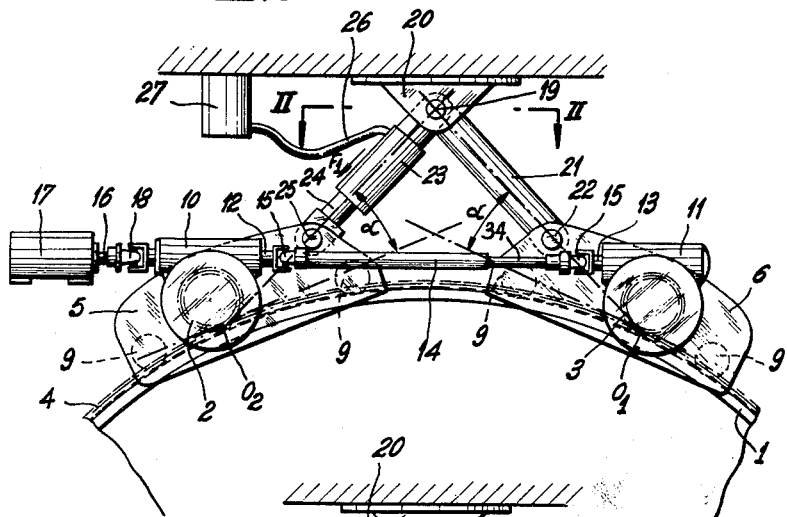
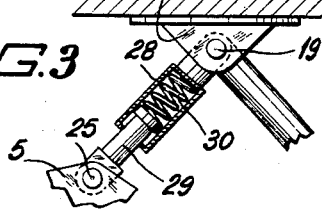
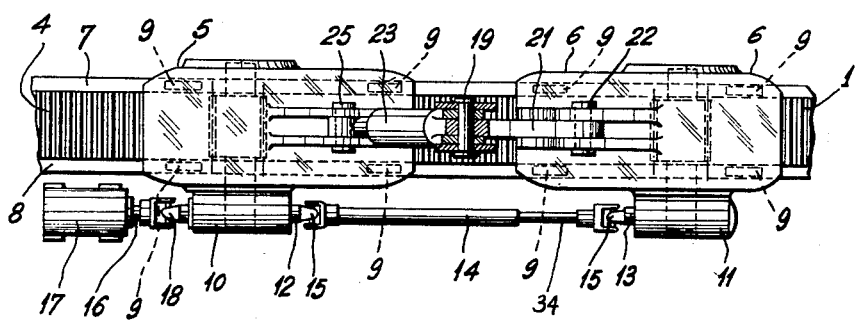
Inventor
François Durand
by
Michael J. Striker

United States Patent Office 3,238,803
Patented Mar. 8, 1966

3,238,803
TRANSMISSION MECHANISMS INCORPORATING PLAY TAKE-UP MEANS
François Durand, 108 Blvd. Carnot, Le Vesinet, France
Filed Mar. 30, 1964, Ser. No. 355,647
4 Claims. (Cl. 74—409)

This invention has specific reference to transmission mechanisms of the type designed for driving a toothed annulus or wheel of relatively great diameter.

It is known that in many applications it is highly necessary to eliminate any play existing between transmission members, notably in radar aerial driving systems and in certain machine-tool driving mechanisms.

It is therefore the essential object of this invention to provide a device designed with a view to take up any play existing or likely to develop between the members of a transmission mechanism.

This device comprises two pinions meshing with a relatively large toothed wheel, which are mounted in supports independent of each other and carrying bearing members such as rollers or shoes engaging one of a plurality of guide tracks formed on the toothed wheel. According to an essential feature of this device the two pinions are driven in turn through a pair of reducing gearings having their input shafts interconnected through a Hooke joint or universal coupling and connected on the other hand to a driving motor, one of said supports being connected to a fixed point by means of a rigid rod pivoted at either end, the other support being connected in turn to a fixed point through a coupling rod provided with pressure or traction means. Thus, this last-named rod is adapted to exert a pressure or a tractive effort on the corresponding support, thus causing the teeth of the pinion mounted on this support to bear against one of the sides of the teeth of the toothed wheel or annulus meshing therewith, the teeth of the pinion carried by the other support being caused to bear against the opposite side of the teeth of said toothed wheel or annulus. Under these conditions, any play is positively eliminated between the teeth of the pinions and those of the toothed wheel or annulus driven thereby.

Two typical forms of embodiment of the transmission mechanisms will play take-up device according to the present invention will be described hereinafter by way of example with reference to the accompanying drawings, in which:

FIGURE 1 is a fragmentary plane view from above of a transmission mechanism constructed according to the teachings of this invention and designed more particularly for driving a large-sized toothed wheel revolving about a vertical axis;

FIGURE 2 is a vertical section taken upon the line II—II of FIGURE 1;

FIGURE 3 is a fragmentary plane view from above showing a modified embodiment of a detail of the device shown in FIGURES 1 and 2;

Figure 4:
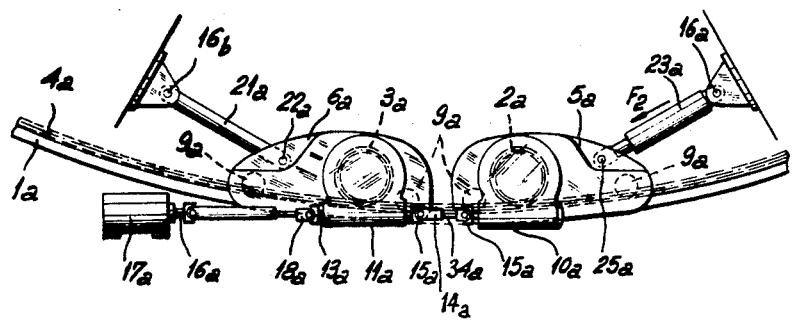
FIGURE 4 is a fragmentary plane view from above showing an alternate form of embodiment of the device of this invention which is designed more particularly for driving a large-sized toothed wheel or annulus revolving about a horizontal axis.

The play take-up transmission mechanism illustrated in FIGURES 1 and 2 of the drawings is adapted to drive a toothed wheel or annulus 1 revolving about a vertical axis.

This device comprises a pair of driving pinions 2, 3 meshing with the teeth 4 of said wheel or annulus 1. Both pinions are mounted in separate supports 5, 6 independent of each other.

Each support 5, 6 comprises bearing members engaging corresponding guide tracks 7, 8 provided on either side of, and concentrically to, the outer periphery of the toothed wheel 1. The bearing members of each support may consist of two pairs of rollers 9 disposed on either side of the plane of meshing engagement between the toothed wheel and the pair of pinions 2 or 3 of the corresponding support. However, if desired the bearing members associated with each support may consist of shoes adapted to engage said guide tracks 7, 8.

Under these conditions the two supports 5, 6 are guided independently of each other. Each support 5, 6 constitutes a kind of trolley or carriage adapted to roll on the rim of the toothed wheel or annulus 1. Moreover, each trolley unit is adapted to pivot about the axis of the toothed wheel 1 in order to ensure a proper meshing engagement between the teeth.

Each pinion 2 or 3 is driven in turn through a primary reduction gearing of which the relevant case 10 or 11 is rigidly mounted on the corresponding support 5 or 6. These reduction gearings may be of the single—or multistage type. Preferably, a worm gearing will be used for this purpose.

The input shafts 12, 13 of these reduction gearings are interconnected through a shaft consisting of two elements 14, 34 mounted telescopically in each other. This shaft comprises a coupling device affording a certain free movement between the shafts 12, 13. Preferably, two Hooke joints or universal couplings 15 will constitute this coupling device. On the other hand, one of the input shafts of the two reduction gearings, for example shaft 12 of reduction gearing 10, is coupled with the output shaft 16 of a motor 17, these two shafts being also coupled through a Hooke joint or universal coupling 18.

One of the supports, for example support 6, is connected to a fixed point 19 shown herein in the form of a pin or stud carried by a fixed member 20. This connection is through a rigid coupling or tie-rod 21 having no elasticity in the axial direction. However, this tie-rod has its two ends pivotally connected the one about the pin or stud 19 and the other about a pivot pin 22 carried by the aforesaid support 6.

The other support 5 is connected to the same fixed point 19 through a rigid coupling rod having a variable length. In the example illustrated in FIGURE 1, this coupling rod consists of a hydraulic cylinder 23. The body of this cylinder is pivoted about the pin 19 and its sliding piston rod 24 is pivotally connected to a pivot pin 25 carried by said support 5. The cylinder 23 is connected through a pipe line 26 to a reservoir 27 containing fluid under pressure.

In the inoperative conditions the coupling rod associated with each support, namely the tie-rod 21 and hydraulic cylinder 23 is substantially in line with the imaginary line led from the point of contact $O_1$ or $O_2$ between the toothed wheel and the corresponding pinion, to the pivot point 22 or 25 of the coupling rod on the relevant support.

On the other hand, the angle $\alpha$, formed between the axis of each coupling rod and the tangent common to the toothed wheel and the pinion on which said coupling rod is pivoted, is preferably slightly greater than the pressure angle existing between the teeth of the driving pinion and those of the toothed wheel.

As will be readily understood, the fluid pressure delivered into the cylinder 23 urges the sliding piston rod thereof in the direction of the arrow $F_1$. The pressure thus transmitted to the support 5 urges the teeth of pinion 2 against the side faces of the teeth of wheel 1 which are directed toward the cylinder 23.

However, as the support 6 is retained by the non-elastic coupling bar 21 the teeth of the corresponding pinion 3 are pressed against the opposite sides of the teeth of wheel 1. Under these conditions, any play existing between the different set of teeth is completely eliminated, and the motor 17 can drive the toothed wheel 1 in either direction of rotation in the absence of any play in the transmission.

The elastic coupling rod connecting the support 5 to the fixed point 19 may consist of any suitable member or device outside the hydraulic cylinder illustrated by way of example. Thus, FIGURE 3 illustrates a modified embodiment wherein said elastic coupling rod consists of two elements 28, 29 mounted telescopically in each other. A compression spring 30 is disposed between these two elements and urges the sliding element 29 towards the support 5. Of course, the element 28 is pivoted on the fixed pin 19 and the sliding element 29 is pivoted on the pin 25 carried by the support 5.

The pressure exerted by the spring 30 urges the support 5 in a direction opposite to that of support 6, thus urging the teeth of pinion 2 against one of the side faces of the teeth of wheel 1. Under these conditions, any play existing in the transmission mechanism is eliminated, as in the preceding form of embodiment.

Figure 5:
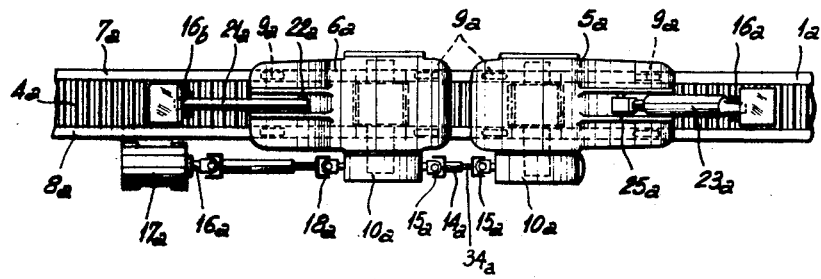
FIGURE 5 is a side elevational view of the arrangement of FIGURE 4.

FIGURES 4 and 5 illustrate another form of embodiment of the play take-up device of this invention. In this arrangement the device is adapted to drive a large-diameter toothed wheel or annulus 1a having an internal set of teeth 4a, the axis of rotation of the wheel or annulus 1a being disposed vertically.

The structure of this device is similar to that of the device illustrated in FIGURES 1 and 2. In fact, this second device comprises similar component elements designated by the same reference numerals to which the letter "a" is added.

However, the two corresponding supports 5a and 6a are not connected to a common fixed point as in the preceding example, these two supports being connected to separate fixed points 16a and 16b respectively.

The support 6a is connected to the relevant fixed point 16b through a rigid tie-rod 21a having no axial elasticity. On the other hand, the support 5a is connected to the fixed point 16a through a coupling rod 23a having a variable length. This coupling rod may consist as in the preceding case either of a hydraulic cylinder or of a telescopic device comprising two elements between which a compression spring is disposed.

This rod 23a tends to exert a pressure in the direction of the arrow $F_2$ on the support 5a. As a consequence, the pinion teeth are caused to engage one of the sides of the teeth of annulus 1a. However, as the other support 6a is retained in this case by the non-elastic coupling or tie-rod 21a, the teeth of pinion 3a are on the other hand urged against the other side faces of the teeth of said toothed annulus or wheel. Thus, any existing play is eliminated between the different sets of teeth of the component elements of the transmission.

The various forms of embodiment of the transmission mechanism of this invention should not be construed as limiting this invention, since many modifications and variations may be brought thereto without departing from the spirit and scope of the invention as set forth in the appended claims. Thus, the coupling rod of variable length connecting one of the supports to a fixed point may be designed with a view to exert a tractive effort instead of a compressive effort on this support. Even in this case any play between the sets of teeth of the meshing members is positively taken up.

The relative position or disposal of the bearing members of each support on the guide tracks may be modified, as desired. Besides, the driven toothed wheel or annulus may comprise a single guide track disposed in its median plane instead of two guide tracks disposed on either side of the teeth.

What I claim is:

1. A play take-up transmission mechanism for driving a toothed wheel, comprising in combination two driving pinions in meshing engagement with said wheel; a pair of supports independent of each other, each one of said supports carrying one of said pinions; on the outer periphery of said toothed wheel at least one guide track; on each one of said support, bearing members engaging said guide track; two reduction gearings each adapted to drive one of said pinions, said reduction gearing comprising each an input shaft; a connecting shaft of variable length disposed between said input shafts of said reduction gearings; at least one articulated coupling between said connecting shaft and one of said input shafts; a motor coupled to the input shaft of one of said reduction gearings; a first rigid coupling rod connecting one of said supports to a fixed point, said rod being pivotally connected at one end to said fixed point and at the other end to the relevant support; another coupling rod of variable length connecting the other one of said supports to a fixed point, said other coupling rod being pivotally connected at one end to said fixed point and at the other end to the corresponding support; means adapted to modify the length of said other coupling rod for transmitting to said corresponding support an effort tending to move said support in relation to said first relevant support.

2. A transmission mechanism as set forth in claim 1, wherein said other coupling rod of variable length comprises a hydraulic cylinder having its body connected through a pipe line to a fluid pressure reservoir.

3. A device according to claim 1, wherein the coupling rod of each support is disposed substantially in line with the imaginary line leading from the point of contact between the toothed wheel and the relevant pinion, to the pivot point of said coupling rod on said support.

4. A device according to claim 3, characterized in that the angle formed between the axis of each coupling rod and the tangent common to said toothed wheel and the pinion of the corresponding support is slightly greater than the pressure angle obtaining between the sets of teeth of said pinion and said toothed wheel.

References Cited by the Examiner
UNITED STATES PATENTS

| | | | |
|---|---|---|---|
| 1,769,957 | 7/1930 | Krotee | 74—397 |
| 3,149,499 | 9/1964 | Schmitter | 74—409 |

DAVID J. WILLIAMOWSKY, *Primary Examiner.*

LEONARD H. GERIN, *Assistant Examiner.*